United States Patent
Vickery et al.

(10) Patent No.: US 7,798,006 B2
(45) Date of Patent: Sep. 21, 2010

(54) POST ASSEMBLY AUTOMATIC ADJUSTMENT OF TPMS SENSOR PRELOAD

(75) Inventors: Paul Edward Vickery, Towcester (GB); Aidrian Nowell, Chipping Norton (GB)

(73) Assignee: Transense Technologies PLC (GB)

( * ) Notice: Subject to any disclaimer, the term of this patent is extended or adjusted under 35 U.S.C. 154(b) by 77 days.

(21) Appl. No.: 12/306,201

(22) PCT Filed: Mar. 28, 2007

(86) PCT No.: PCT/GB2007/001142
§ 371 (c)(1),
(2), (4) Date: Dec. 22, 2008

(87) PCT Pub. No.: WO2007/148034
PCT Pub. Date: Dec. 27, 2007

(65) Prior Publication Data
US 2009/0277274 A1 Nov. 12, 2009

(30) Foreign Application Priority Data
Jun. 23, 2006 (GB) .................... 0612520.7
Jun. 30, 2006 (GB) .................... 0613060.3

(51) Int. Cl.
*G01L 11/04* (2006.01)
(52) U.S. Cl. .................... 73/702; 73/704; 73/703; 73/592

(58) Field of Classification Search .............. None
See application file for complete search history.

(56) References Cited

U.S. PATENT DOCUMENTS

| 4,331,022 A * | 5/1982 | Coussot et al. ............ 73/1.59 |
| 2004/0255681 A1* | 12/2004 | Cook et al. ............ 73/715 |
| 2005/0050955 A1* | 3/2005 | Gall et al. ............ 73/715 |
| 2005/0262944 A1* | 12/2005 | Bennett et al. ............ 73/592 |

FOREIGN PATENT DOCUMENTS

| EP | 0023450 A1 | 2/1981 |
| GB | 2386684 A | 9/2003 |
| JP | 2001077661 A | 3/2001 |
| JP | 2005354272 A | 12/2005 |
| WO | WO2004113859 A1 | 12/2004 |

* cited by examiner

*Primary Examiner*—Andre J Allen
(74) *Attorney, Agent, or Firm*—Keusey & Associates, P.C.

(57) ABSTRACT

A method of manufacturing a pressure monitoring package comprises the steps of mounting a plurality of resonators onto a substrate 1, mounting the substrate 1 in a package base 11, mechanically constraining the package base 11 within a mechanical preloading jig, and adjusting the preload using the jig whilst measuring the frequency of the SAWs until the required frequency is obtained. A lid 7 is then welded onto the package base 11 using a laser welder, after which the preload frequency of the package 10 is fine tuned by using the laser welder to produce laser marks 21-28, 31-38 on the outside of the package 10.

18 Claims, 2 Drawing Sheets

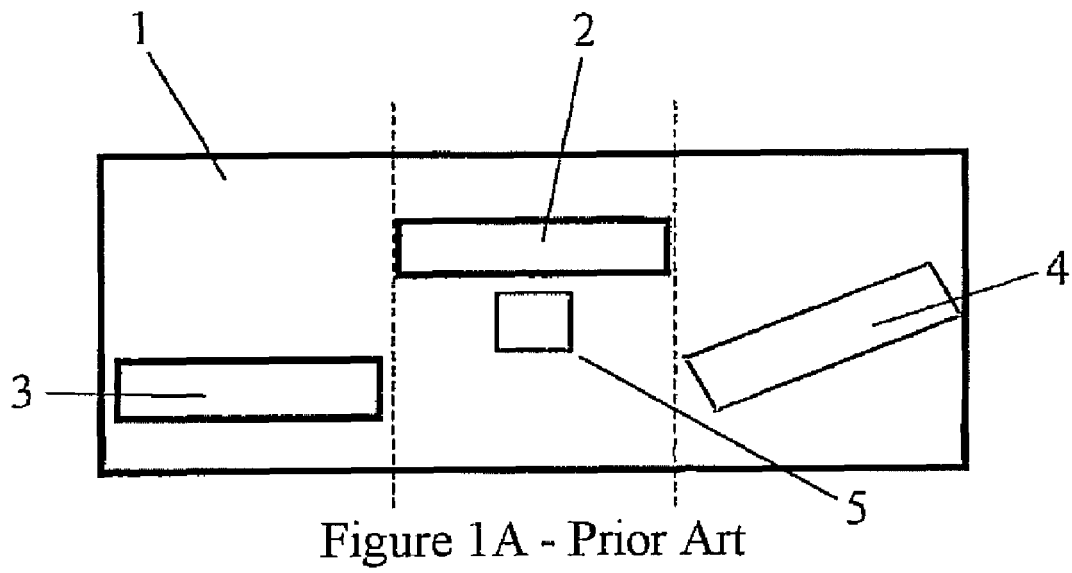
Figure 1A - Prior Art
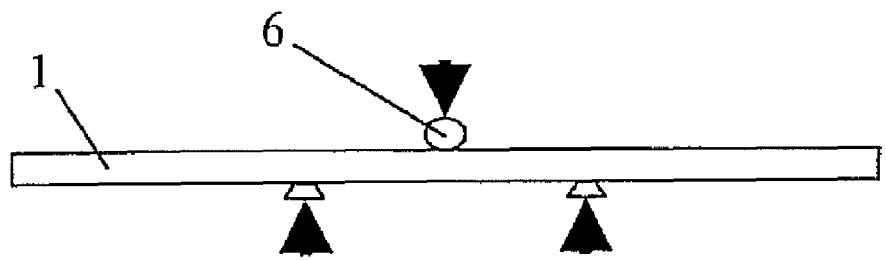
Figure 1B - Prior Art
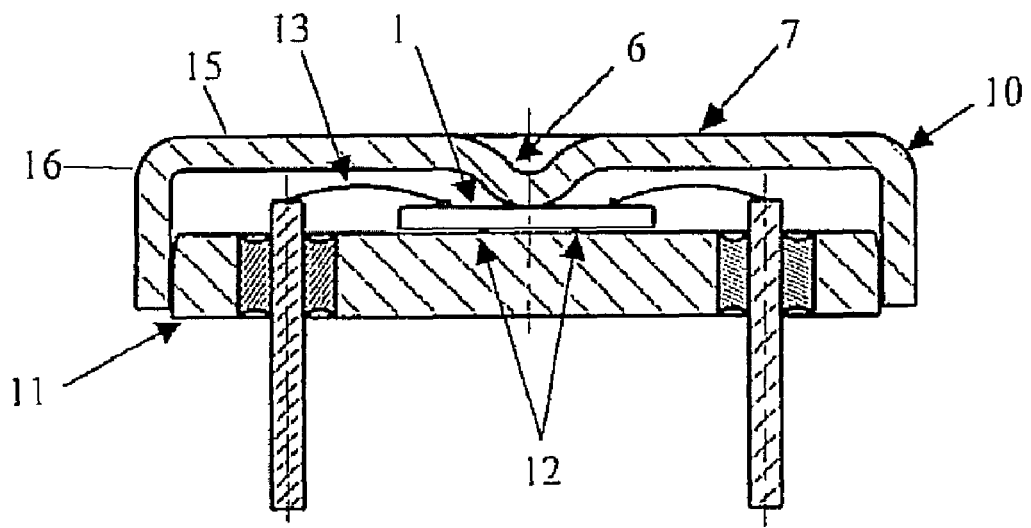
Figure 2 - Prior Art

US 7,798,006 B2

POST ASSEMBLY AUTOMATIC ADJUSTMENT OF TPMS SENSOR PRELOAD

BACKGROUND OF THE INVENTION

1. Field of the Invention

The present invention relates to SAW based tyre pressure sensors (TPMS) and in particular automatic adjustment of the preloaded pressure SAW resonator frequency after the final assembly of the package.

2. The Prior Art

It is known in the art to measure pressure and temperature by the frequency variation of 3 SAW resonators disposed in the detection region. Applicants own earlier application number GB 0302311.6, granted as GB 2386684, discloses, for example, a substrate suspended between two ledges, as shown in the FIG. 1. The package lid/diaphragm has dimple which presses on the quartz substrate. Variation in pressure bends the SAW substrate in turn distorting the SAW resonators modifying the frequency. All three resonators respond to temperature. Only the P SAW responds to pressure therefore ΔF (P–T1) is proportional to pressure. Quartz is an anisotropic material, as such T1 and T2 have different responses to temperature, therefore ΔF (T1–T2) is proportional to temperature.

FIG. 2 shows the assembly of the TPMS sensor. The SAW die sits centrally between two ledges. The SAW is wire bonded to the electrically isolated pins. The lid/diaphragm is lowered onto the quartz.

During the manufacturing process it is essential to preload the Pressure SAW within a tight frequency tolerance in order to reduce manufacturing variations and ensure that the frequency of operation adheres to the relevant radio frequency transmission regulation bands for example ISM Band (Industrial, Scientific and Medical). During the preload process, the package is mechanically constrained within a mechanical preloading jig while simultaneously measuring the frequency of the Pressure SAW. When the correct frequency is achieved the package base and lid is welded together using a laser welder. However, due to the mechanical effects of laser welding the sealing of the package produces a shift in the preloaded frequency. Currently this shift and production spread has to be incorporated into and allowed for by modifying the preload frequency.

SUMMARY OF THE INVENTION

According to the present invention there is provided a method of adjusting the preload of pressure monitoring package by producing marks (involving small zones of plastic deformation) on the outside of the sealed package in order to produce a shift in the preload frequency of the package. These marks may be produced by but not limited to the use of a laser.

According to another aspect of the present invention there is provided a method of manufacturing a pressure monitoring package comprising the steps of mounting a plurality of SAW resonators onto a substrate, mounting the substrate in a package base, mechanically constraining the package base within a mechanical preloading jig, adjusting the preload using the jig whilst measuring the frequency of the SAWs until the required frequency is obtained, welding a lid to the package base using a laser welder, and then fine tuning the preload frequency by using the laser welder to produce laser marks on the outside of the package.

The present invention has the advantage that it enables very accurate setting of the preload frequency after the lid has been fixed to the base—the stage at which, conventionally, changes in the preload frequency can occur, which is much more effective than the prior art approach of trying to anticipate the frequency shift which would occur and adjusting the jigged preload frequency, prior to welding the lid, in order to compensate for this anticipated shift.

BRIEF DESCRIPTION OF THE DRAWINGS

In order that the invention may be well understood, there will now be described and embodiment thereof, given by way of example, reference being made to the accompanying drawings, in which:

FIG. 1A is a diagrammatic illustration of a temperature compensated SAW based pressure sensor according to the prior art;

FIG. 1B is a side view of a diagrammatic illustration of a temperature compensated SAW based pressure sensor according to the prior art;

FIG. 2 is a sectional side view of a pressure sensor assembly embodying the sensor of FIGS. 1A and 1B;

DETAILED DESCRIPTION OF THE PREFERRED EMBODIMENTS

Figure 3A:
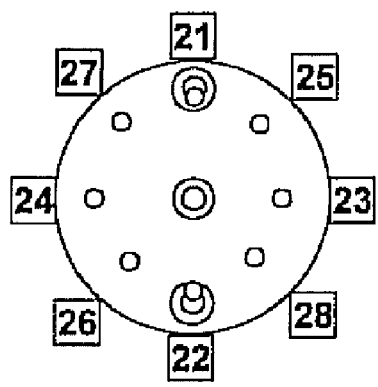
FIG. 3A is a diagrammatic illustration of the present invention showing a pattern of spots used to increase preload frequency.

FIG. 1 shows a typical temperature compensated pressure sensor such as is used for tyre pressure monitoring, which is known from the prior art. The sensor is composed of a substrate 1 which is engaged by a dimple 6 of a diaphragm 7 at a point 5 so as to transmitted pressure variations to substrate, producing variations in the strain field therein which, in turn, is detected by Surface Acoustic Wave devices 2, 3, 4 mounted on the substrate 1. In particular, as shown in FIG. 1, three SAWs are provided on the substrate—a first pressure measuring SAW 2 which is mounted on a strained region of the substrate 1, a first temperature measuring SAW 3 mounted on an unstrained region of the substrate 1 with its longitudinal axis aligned with that of the pressure SAW 2, and a second temperature measuring SAW 4 also mounted on an unstrained region of the substrate 1 with its longitudinal axis inclined to that of the pressure SAW 2 and first temperature SAW 3. This configuration enables effective temperature compensated pressure readings to be taken as is known from the prior art.

The substrate is enclosed in a package in order to form the sensor assembly as shown in FIG. 2, the package 10 having a base 11 on which the substrate is simply supported on ledges 12, and a diaphragm 7, formed by the package lid. The diaphragm 7 is subjected to the pressure environment to be measured on its upper surface whilst the interior 13 of the package 10 is charged with a reference pressure to which the lower surface of the diaphragm 7 is subjected. Pressure variations in the outside environment therefore cause defections of the diaphragm 7 which are transmitted by means of dimple 6 to the substrate 1. In order to adjust the preload of the pressure monitoring package in accordance with the present invention, marks 21-28, 31-38 in the form of small zones of plastic deformation are formed on the outside of the sealed package 10. These marks 21-28, 31-38 produce a shift in the preload frequency of the package, enabling fine tuning of the frequency of operation of the package. The spots may be produced in a number of different ways, such as using a laser.

Figure 4A:
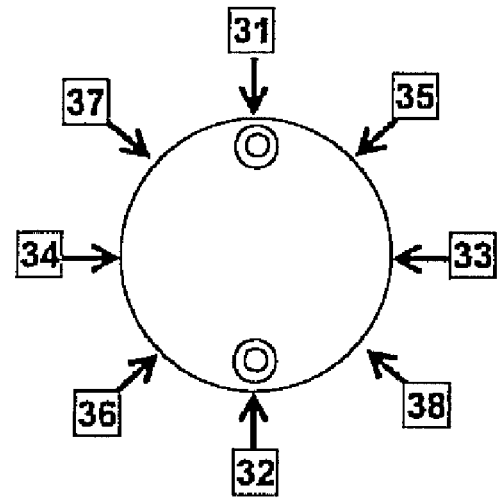
FIG. 4A is a diagrammatic illustration of the present invention showing a pattern of spots used to reduce preload frequency.
Figure 3B:
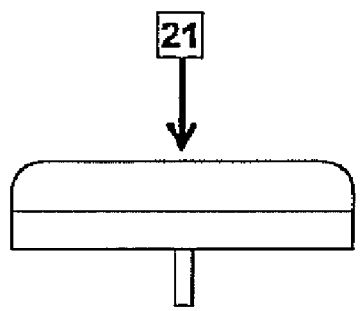
FIG. 3B is a side view of a diagrammatic illustration of the present invention showing a pattern of spots used to increase preload frequency.
Figure 4B:
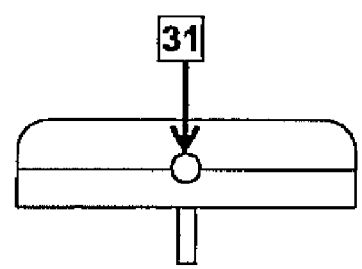
FIG. 4B is a side view of a diagrammatic illustration of the present invention showing a pattern of spots used to reduce preload frequency.

More particularly, laser spots are applied to the surface and/or the edge of the lid/diaphragm 7 of the package 10, a laser spot applied to the surface 15 of the lid/diaphragm 7 as shown, for example. in FIG. 3, producing a frequency shift up, whilst a laser spot applied to the edge 16 of the lid/diaphragm 7, as shown in FIG. 4, produces a frequency shift down if on the edge of the lid/diaphragm.

To put it another way, laser spots applied to the side of the diaphragm reduced the preload frequency and spots applied to the top surface of the diaphragm increased the preload. Each laser spot, positioned by eye, producing a preload frequency shift in the range of 20 to 40 kHz.

The amount of frequency shift produced by each spot is dependent upon the diameter, position and the depth of penetration of the mark. The repeatability of the frequency shift can be achieved by mechanical positioning of the laser. Preferably, each laser mark is a laser spot, although other marks may be used such as continuous laser lines. The present invention has the further advantage that the addition of the frequency tuning laser spots do not have a negative impact on sensor sensitivity, hysteresis, local fatigue etc.

This process provides huge benefits for the volume manufacture of SAW based TPMS sensors, e.g. less need for accurate mechanical preload frequency setting; tighter tolerances achievable for the frequency on the pressure SAW; automation of the preload process and, as a result, significant manufacturing cost benefits.

The invention claimed is:

1. A method of adjusting the preload of a pressure monitoring package (10) comprising the step of:
   producing at least one mark (21-28, 31-38) on the outside (15, 16) of the sealed package (10) in order to produce a shift in the preload frequency of the package.

2. The method according to claim 1, wherein the step of producing marks comprises producing small zones of plastic deformation.

3. The method according to claim 1, wherein the marks are produced by use of a laser.

4. The method according to claim 3, wherein the marks are produced using a laser welder.

5. The method according to claim 1, wherein said marks are applied to at least one of the surface (15) of a lid (7) of the package (10) and an edge (16) of the lid/diaphragm (7) of the package (10).

6. The method according to claim 1, wherein the diameter, position and depth of penetration of the or each mark (21-28, 31-38) are varied to vary the resulting frequency shift produced thereby.

7. The method according to claim 1, wherein each mark is a spot.

8. The method according to claim 1, wherein each mark is a continuous line.

9. A pressure monitoring package comprising:
   a plurality of resonators (2, 3, 4) mounted onto a substrate (1), which, in turn, is mounted in a package base (11); and
   a lid (7) welded onto the package base (11), the outside (15, 16) of the package (10) having marks produced thereon which fine tune the preload frequency of the package.

10. The pressure monitoring package according to claim 9, wherein the marks are produced on at least one of the surface (15) of the lid (7) of the package (10) and an edge (16) of the lid/diaphragm (7) of the package (10).

11. A method of manufacturing a pressure monitoring package comprising the steps of:
   mounting a plurality of resonators (2, 3, 4) onto a substrate (1);
   mounting the substrate (1) in a package base (11);
   mechanically constraining the package base (11) within a mechanical preloading jig;
   adjusting the preload using the jig whilst measuring the frequency of the resonators (2, 3, 4) until the required frequency is obtained;
   welding a lid (7) to the package base (11); and
   fine tuning the preload frequency by producing marks (21-28, 31-38) on the outside of the package (10).

12. The method according to claim 11, wherein the step of producing marks comprises producing small zones of plastic deformation.

13. The method according to claim 11, wherein the marks are produced by use of a laser.

14. The method according to claim 13, wherein the marks are produced using a laser welder.

15. The method according to claim 11, wherein said marks are applied to at least one of the surface (15) of a lid (7) of the package (10) and an edge (16) of the lid/diaphragm (7) of the package (10).

16. The method according to claim 11, wherein the diameter, position and depth of penetration of the or each mark (21-28, 31-38) are varied to vary the resulting frequency shift produced thereby.

17. The method according to claim 11, wherein each mark is a spot.

18. The method according to 11, wherein each mark is a continuous line.

* * * * *

UNITED STATES PATENT AND TRADEMARK OFFICE
CERTIFICATE OF CORRECTION

| | | |
|---|---|---|
| PATENT NO. | : 7,798,006 B2 | |
| APPLICATION NO. | : 12/306201 | |
| DATED | : September 21, 2010 | |
| INVENTOR(S) | : Paul Edward Vickery et al. | |

It is certified that error appears in the above-identified patent and that said Letters Patent is hereby corrected as shown below:

Claim 18, line 1, after "according to" insert --claim--.

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,798,006 B2 | Page 1 of 1 |
| APPLICATION NO. | : 12/306201 | |
| DATED | : September 21, 2010 | |
| INVENTOR(S) | : Paul Edward Vickery et al. | |

It is certified that error appears in the above-identified patent and that said Letters Patent is hereby corrected as shown below:

Column 4, line 50 (Claim 18, line 1) after "according to" insert --claim--.

This certificate supersedes the Certificate of Correction issued March 15, 2011.

Signed and Sealed this
Twenty-sixth Day of April, 2011

David J. Kappos
*Director of the United States Patent and Trademark Office*